US011976446B2

(12) United States Patent
Tieszen

(10) Patent No.: US 11,976,446 B2
(45) Date of Patent: May 7, 2024

(54) SPIGOT FREEZE PREVENTION APPARATUS AND METHOD

(71) Applicant: Dwayne A. Tieszen, Watauga, TX (US)

(72) Inventor: Dwayne A. Tieszen, Watauga, TX (US)

( * ) Notice: Subject to any disclaimer, the term of this patent is extended or adjusted under 35 U.S.C. 154(b) by 473 days.

(21) Appl. No.: 17/230,001

(22) Filed: Apr. 14, 2021

(65) Prior Publication Data

US 2022/0333361 A1 Oct. 20, 2022

(51) Int. Cl.
*E03B 7/14* (2006.01)
*H05B 3/00* (2006.01)

(52) U.S. Cl.
CPC .............. *E03B 7/14* (2013.01); *H05B 3/0033* (2013.01)

(58) Field of Classification Search
CPC ................................ E03B 7/14; H05B 3/0033
USPC ........................................................... 138/33
See application file for complete search history.

(56) References Cited

U.S. PATENT DOCUMENTS 1,224,030 A * 4/1917 Smith ................ H01R 13/5219 439/280
1,345,593 A * 7/1920 Giddens ................. A01K 41/00 219/521
1,611,606 A * 12/1926 Pope ......................... E03B 9/14 138/33
1,723,743 A * 8/1929 Mason ................. H05B 3/0033 122/4 A
1,735,165 A 11/1929 Hornby
1,873,820 A * 8/1932 Carpenter ............... F24H 1/121 392/493
2,382,512 A * 8/1945 Simon ..................... F16L 53/30 138/33
3,636,312 A * 1/1972 Dreher ................... A01K 7/027 137/341
4,559,440 A * 12/1985 Hamasaka ............. A43B 3/355 219/211
4,927,993 A * 5/1990 Simmons ............ E05B 17/0016 219/202
5,004,894 A * 4/1991 Whitehead ........... H05B 3/0033 219/521
5,420,466 A * 5/1995 Powers ................ H05B 3/0033 392/407
5,614,119 A 3/1997 Ollis
5,859,953 A * 1/1999 Nickless ................. F16L 53/38 138/33
6,536,458 B1 3/2003 Kindermann
6,949,718 B1 * 9/2005 Hockenberry ....... H05B 3/0033 219/521
10,393,361 B1 * 8/2019 Pessenda ................ F21V 23/04
10,935,254 B2 * 3/2021 Toomey .............. F24D 19/0095
2010/0200559 A1 * 8/2010 Marcotte .................. H05B 3/58 219/214

* cited by examiner

*Primary Examiner* — David R Deal
(74) *Attorney, Agent, or Firm* — Dan Brown Law Office; Daniel R. Brown

(57) ABSTRACT

Apparatus and method to prevent water spigot freezing, which utilizes a mounting collar to engage a discharge spout of a spigot, an incandescent lamp holder that locates the lamp within the discharge spout, and an intrinsically safe low voltage power supply, which may utilize a battery or utility power, to thereby couple thermal energy from the incandescent lamp into the spigot.

18 Claims, 7 Drawing Sheets

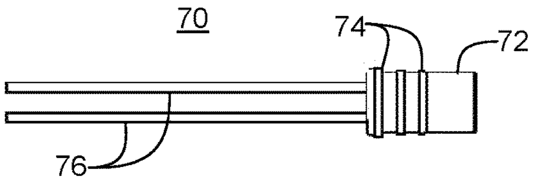
Fig. 7A
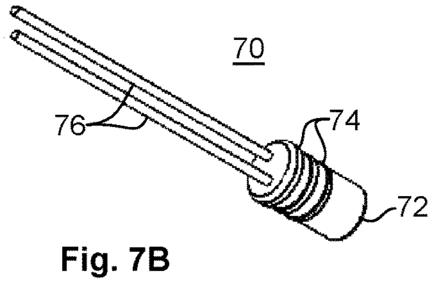
Fig. 7B
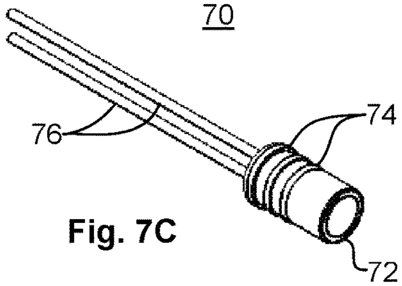
Fig. 7C
Fig. 8C
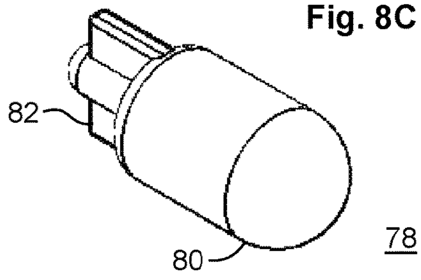
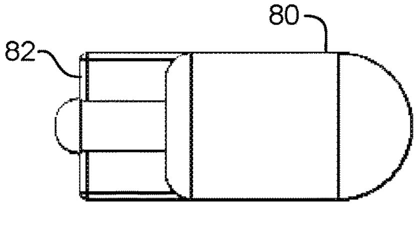
Fig. 8A
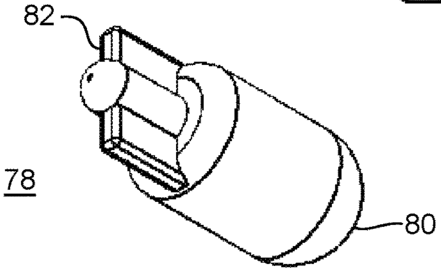
Fig. 8B

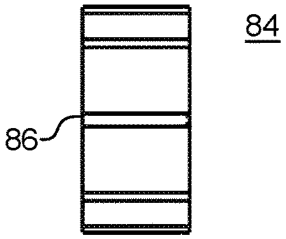
Fig. 9C
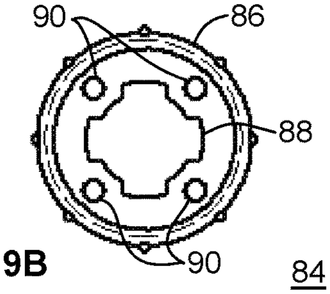
Fig. 9B
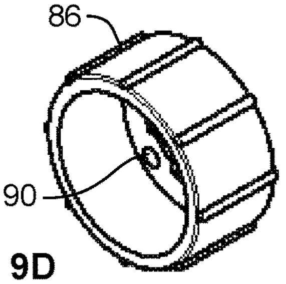
Fig. 9D
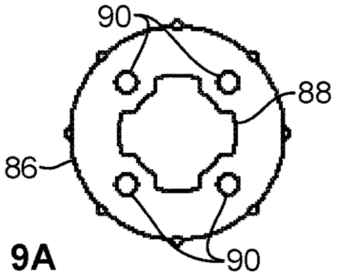
Fig. 9A
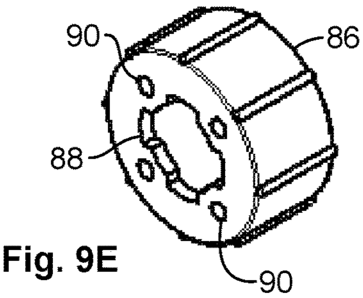
Fig. 9E
Fig. 10C
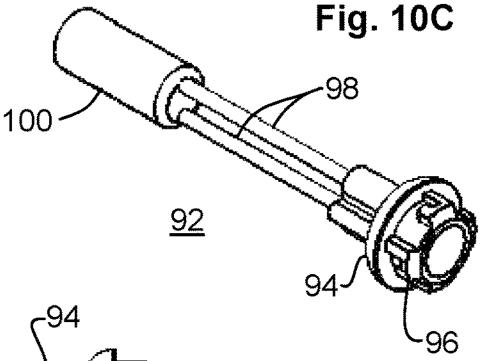
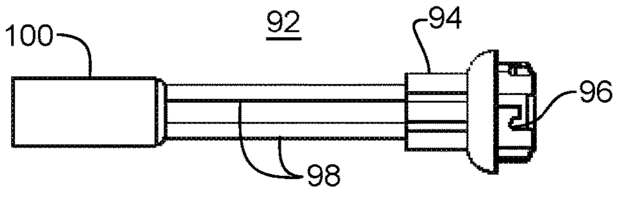
Fig. 10A
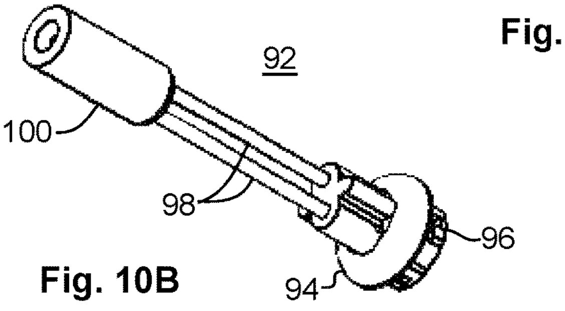
Fig. 10B

SPIGOT FREEZE PREVENTION APPARATUS AND METHOD

BACKGROUND OF THE INVENTION

Related Applications

None.

Field of the Invention

The present disclosure relates to freeze prevention for exterior water spigots. More particularly, the present disclosure relates to apparatus and methods employing a mounting collar with a lamp holder that locates an incandescent lamp within the discharge spout of a water spigot, which is powered by an intrinsically safe low voltage power supply utilizing battery and/or utility power, to thereby couple thermal energy from the incandescent lamp into the spigot.

DESCRIPTION OF RELATED ART

The presence of water spigots on building exteriors, including residential structures, retail establishments, and commercial building, are ubiquitous in the United States, and around the world. In climates where freezing temperatures occur, the problem of frozen spigots is well known, which may result in interrupted water supply from frozen spigots, rupturing of spigots and connected supply pipes, and a substantial potential for flooding and flood damage.

A number of products are available to address the issue of frozen spigots. A commonly available solution is to install an insulated cup about the exterior portion of the spigot, retained in place by some sort of fastener. This is a low cost option that can easily be installed by end users, however, since the insulation adds no heat energy to the system, it merely slows the rate at which heat loss occurs, often times resulting frozen spigots after somewhat longer exposure to freezing temperatures. Another option is to replace the spigot with an extended spigot that locates the valve seat and water supply pipes further inward toward the warmer side of the exterior wall on which the spigot is mounted. This option can be effective, but carries a high cost, given the requirement to purchase and install a new spigot, or have installed, including modification to existing building plumbing.

Other options are known in the art, such as the use of heat tapes wrapped about the spigot, sometime covered with thermal insulation. Such heat tapes generally operate on utility power, and thus must address the risk of electrical shock, which is exacerbated by the wet environment nature of water spigot applications. These solutions are also expensive, and generally require the skills of a tradesman to install. Other powered systems are known, which employ resistive heating elements and control systems that operate on utility power sources, which all carry issues related to dangerous voltages and currents involved, and the need for specialized components, both of which drive up cost to the end user. Still other systems are known, which insert a heating component along the feed pipe to the spigot, requiring modification of the building plumbing to install, again, driving up the cost of installing such systems. Thus, it can be appreciated that there is a need in the art for a low cost apparatus and method for controlling freezing of exterior water spigots, which is intrinsically safe, and which can be self-installed by end users.

SUMMARY OF THE INVENTION

The problems in the prior art are addressed by the apparatus and methods of present invention. The present disclosure teaches an apparatus that prevents water from freezing in a spigot that has a discharge spout. The apparatus includes a mounting collar that engages the spigot about the discharge spout, and a lamp holder coupled to the mounting collar, which accepts an incandescent lamp, and which locates the lamp within the discharge spout while the mounting collar is attached to the spigot. An electrical interface is connected to the lamp holder and extends from its exterior surface. A power supply is connected to the electrical interface to selectively illuminate the incandescent lamp, and thereby couple thermal energy from the incandescent lamp into the spigot.

In a specific embodiment of the foregoing apparatus, the mounting collar has a hole formed through it to the exterior surface, which supportively engages the lamp holder, when inserted though the hole.

In a specific embodiment of the foregoing apparatus, the mounting collar is fabricated from a translucent material enabling light emitted from the incandescent lamp to be visible about the exterior surface of the mounting collar, so the user can confirm whether the lamp is illuminated or not.

In a specific embodiment of the foregoing apparatus, the mounting collar includes one or more weep openings passing from the interior of the spout through the exterior surface, which facilitates water draining from the spigot.

In a specific embodiment of the foregoing apparatus, the spout has a male garden hose thread, and the mounting collar has a female garden hose thread that engages the male garden hose thread.

In a specific embodiment of the foregoing apparatus, the mounting collar engages the spout using compressive force provided by an elastic member disposed about the mounting collar.

In a specific embodiment of the foregoing apparatus, the incandescent lamp and power supply operate at a nominal twelve volts direct current, which are intrinsically safe for wet environments. In a refinement to this embodiment, the electric interface is a commercially available twelve volt connector selected from a barrel connector and a two-conductor flat automotive connector. In another refinement to this embodiment, the incandescent lamp is a twelve volt nominal lamp commonly available in commercial distribution from automotive parts suppliers.

In a specific embodiment, the foregoing apparatus further includes a battery coupled between the power supply and the electrical interface, to provide electric current to the lamp holder while the power supply is not providing electric power. In a refinement to this embodiment, the power supply is a battery charger connected to the utility power supply, and the battery is a rechargeable battery, which facilitates battery-backed operation of the incandescent lamp during power outage in the utility power supply.

The present disclosure teaches a method of preventing water from freezing in a spigot that has a discharge spout using a mounting collar, a lamp holder that accepts an incandescent lamp, and that is coupled to an electrical interface extending from an exterior surface of the mounting collar, and a power supply. The method includes the steps of connecting the mounting collar to the spigot discharge spout, coupling the lamp holder to the mounting collar, which locates the incandescent lamp within the discharge spout, and connecting the power supply to the electrical interface. Then, selectively illuminating the incandescent lamp, and thereby coupling thermal energy from the incandescent lamp into the spigot.

In a specific embodiment of the foregoing method, where the mounting collar has a hole formed through to its exterior surface, the method further includes inserting the lamp holder through the hole, thereby supportively engaging the lamp holder with the mounting collar.

In a specific embodiment of the foregoing method, where the mounting collar is fabricated from a translucent material, the method further includes enabling light emitted from the incandescent lamp to be visible from the exterior of the mounting collar, thereby facilitating user confirmation that the lamp is illuminated.

In a specific embodiment of the foregoing method, where the spout has a male garden hose thread, and the mounting collar has a female garden hose thread, the method includes attaching the mounting collar to the spout by engaging the female garden hose thread with the male garden hose thread.

In a specific embodiment, the foregoing method further includes connecting and retaining the mounting collar ion the spout with using compressive force provided by an elastic member disposed thereabout. In yet another specific embodiment, wherein the mounting collar includes at least a first weep opening extending from the interior thereof through to the exterior surface, the method further includes visually determine that light is emitted through the at least a first weep opening, thereby confirming operation of the lamp.

In a specific embodiment of the foregoing method the incandescent lamp and power supply operate at a nominal twelve volts direct current, thereby providing for intrinsically safe operation in wet environments. In a refinement to this embodiment, the method further includes coupling a battery between the power supply and the electrical interface, and thereby providing electric current to the lamp holder while the power supply is not providing electric power. In a further refinement, where the power supply is a battery chargers and the battery is a rechargeable battery, the method further includes connecting the power supply to a utility power supply, to thereby facilitate battery operation of the incandescent lamp during power outage in the utility power supply.

BRIEF DESCRIPTION OF THE DRAWINGS

FIGS. 7A, 7B, and 7C are a side view drawing and two perspective view drawings, respectively, of a lamp holder according to an illustrative embodiment of the present invention.

FIGS. 8A, 8B, and 8C are a side view drawing and two perspective view drawings, respectively, of a wedge-base incandescent lamp according to an illustrative embodiment of the present invention.

FIGS. 9A, 9B, 9C, 9D, and 9E are drawings of a mounting collar according to an illustrative embodiment of the present invention.

FIGS. 10A, 10B, and 10C are a side view drawing and two perspective view drawings, respectively, of a lamp holder according to an illustrative embodiment of the present invention.

DESCRIPTION OF THE INVENTION

Figure 1:
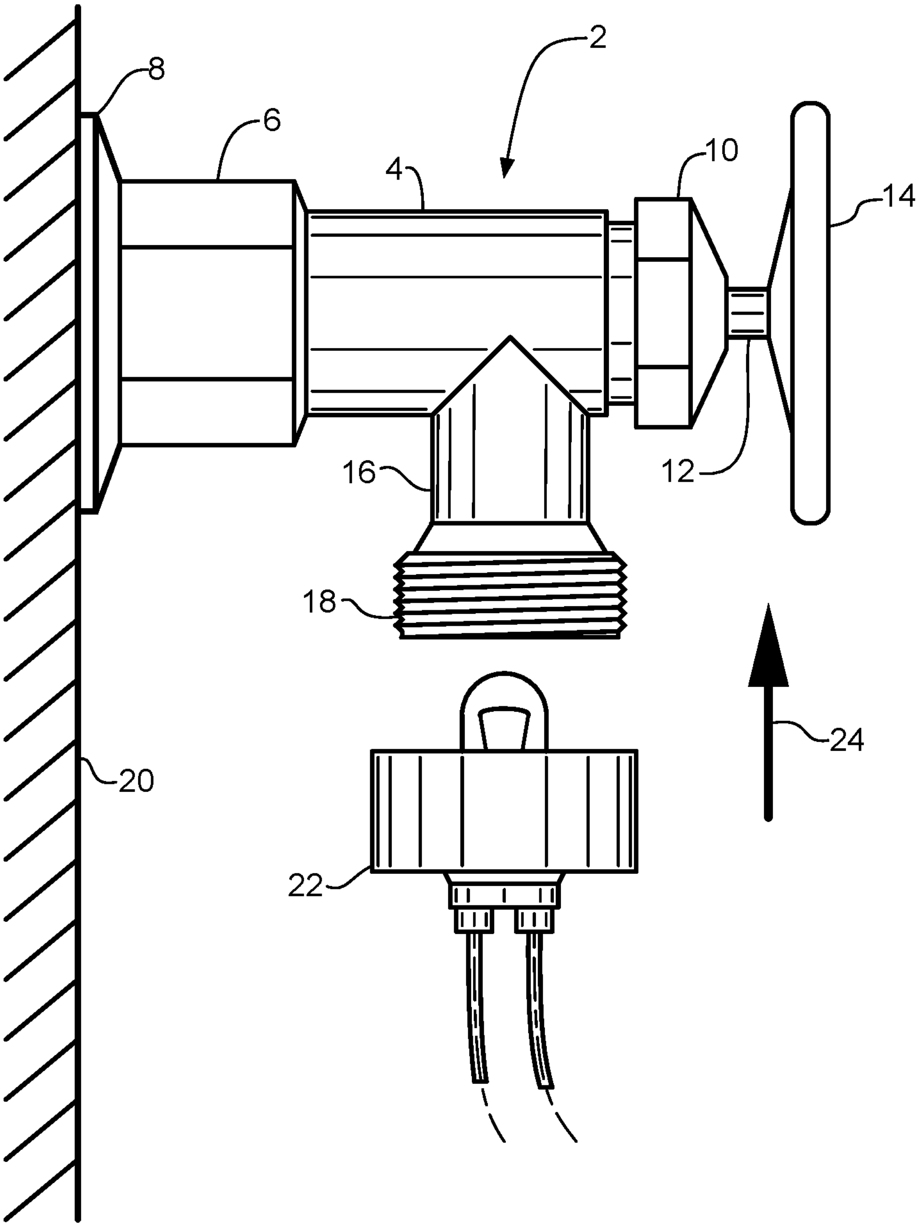
FIG. 1 is a drawing of a hose spigot and lamp assembly according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components, and method steps, have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

The present disclosure advantageously utilizes low cost and readily available components to implement a water spigot freeze prevention apparatus and method, which transfers waste heat energy emitted by a low voltage incandescent lamp to warm a spigot, thereby preventing water in the spigot from freezing. An illustrative embodiment includes a mounting collar that attaches to the spout portion of a spigot, typically by connection with a conventional garden hose thread ("GHT"), and retains a lamp holder in suitable position such that an incandescent lamp fixed to the lamp holder is located, at least partially, within the spout. Electric current is coupled to the lamp holder, and lamp, through an electrical connection located on the exterior of the mounting collar. Empirical testing has determined that modest power, on the order of five watts, will produce a temperature differential of thirty degrees Fahrenheit, or more, in the spigot body, which is sufficient to prevent freezing at temperatures of zero degrees Fahrenheit, or less. The power of the lamp may be increased in colder climate, or insulation may be added external to the spigot to reduce ambient heat losses. By utilizing automotive components that operate on a nominal twelve volts direct current, (typically 13.8 volts DC), two important advantages are realized. First, such automotive components are readily available and in wide distributing through auto parts distributors at low cost. Second, such low voltage direct current devices are intrinsically safe and meet the requirements of leading regulatory and safety standards, particularly important in outdoor and wet environments.

In the United States, various regulations, codes, and organizations address the issues surrounding electrical safety. For electrical power distribution, the US National Electrical Code (NEC), NFPA 70, article 725 (2005), defines low distribution system voltage (LDSV) as 0 to 49 volts. The National Fire Prevention Association (NFPA) standard 79 article 6.4.1.1 defines distribution protected extra-low voltage (PELV) as nominal voltage of 30 Vrms or 60 Vdc ripple-free for dry locations, and 6 Vrms or 15 Vdc in all other cases. Underwriters Laboratories, (UL) standard 508A, article 43 defines 0 to 20 volts peak/5 amps or 20.1 to 42.4 volts peak/100 VA as low-voltage limited energy (LVLE) circuits. Accordingly, under the National Electrical Code, 13.8 volts AC is "low voltage". Under the National Fire Prevention Association, for non-dry locations, less than 6 volts AC, and less than 15 volts DC are low voltage. Furthermore, under the Underwriters Laboratory standards, 14.1 volts AC (20 volts peak) is low voltage for up to 5 amps (note that the designs of the present disclosure draws about 5 watts at 360 milliamps). This it can be appreciated the illustrative embodiments satisfy all these requirements for safety.

Reference is directed to FIG. 1, which is a drawing of a hose spigot 2 and lamp assembly according to an illustrative embodiment of the present invention. The spigot 2 may be of any convention design utilized on residential, commercial, and retail applications. Such spigots 2 typically includes a metal body 4 having a water valve opening and valve seat located internally (not illustrated). The body 4 includes a pipe connector 6 that attaches to building supply pipes (not illustrated) located internal of an exterior wall 20 of a building. A mounting flange 8 is typically proved as well. A valve stem 12 protrudes through a bonnet 10, which encloses a packing (not illustrated) to prevent water seepage. At the distal end of the stem 12 is a handle 14 for manual operation the spigot 2. The spigot 2 typically includes a spout 16 through which water is discharged when the internal valve is opened. The spout 16 may, or may not, include an attachment means 18, which is a male garden hose thread ("GHT") in the vast majority of applications in the United States. More particularly, the male GHT enables connection of a garden hose having a female GHT fitting. The thread standard for garden hose connectors in the United States, its territories, and Canada is known colloquially as "garden hose thread" ("GHT"), but its official designation is NH, which stands for "National Hose". This is a ¾ inch, 11.5 thread per inch, for full form thread as produced by cutting material such as the brass spigot outlet or hose male or female end fitting found on garden hoses. Some spigots, however, have a smooth discharge spout, which can also serve as the attachment means 18. In operation, the lamp assembly 22 is attached 24 to the spout 16 of the spigot 2, by utilizing the attachment means 18.

In this disclosure, an exterior water valve is referred to as a "spigot". However, it is understood that various names are in common use for such devices. These names include, but are not limited to, a faucet, a hydrant, a hose bib, a tap, a water valve, a hose tap, a sillcock, and others, are known to those skilled in the art. The teachings of the present disclosure are applicable to all of them.

It is understood that 90%, or more, of the energy consumed by incandescent lamps is heat, not light. Therefore, utilizing the waste heat portion of the energy yields a 90% efficient heat source. Alternatively, cartridge heaters or similar heat elements, are considerably more expensive and difficult to source and maintain by consumers. However, low voltage incandescent lamps are readily available and inexpensive. For example, automotive side marker lamps such as the commonly available #194 and #168 wedge base lamps, are low cost lamps in the five watt power range. In addition, lamp holders are readily available and enable simple and rapid replacement of the lamp. Low voltage direct current power has the benefits of mitigating or eliminating shock hazards. With respect to efficiency, heat cables are available, but they consume about seven watts of power per foot. The shortest heat cable commonly available is three 3 feet in length which translates to twenty-one watts of power consumption. Furthermore, heat cables are bulky and are made to protect lengths of pipe. They also require a temperature module to be in contact with the pipe to regulate operation. Without module contact, a heat cable will never turn off and could present a malfunction risk. Wrapping a heat cable around a small area is not practical or recommended. By comparison, the illustrative embodiments of the present disclosure are easy, compact, and convenient to install for effective freeze protection.

Figure 2:
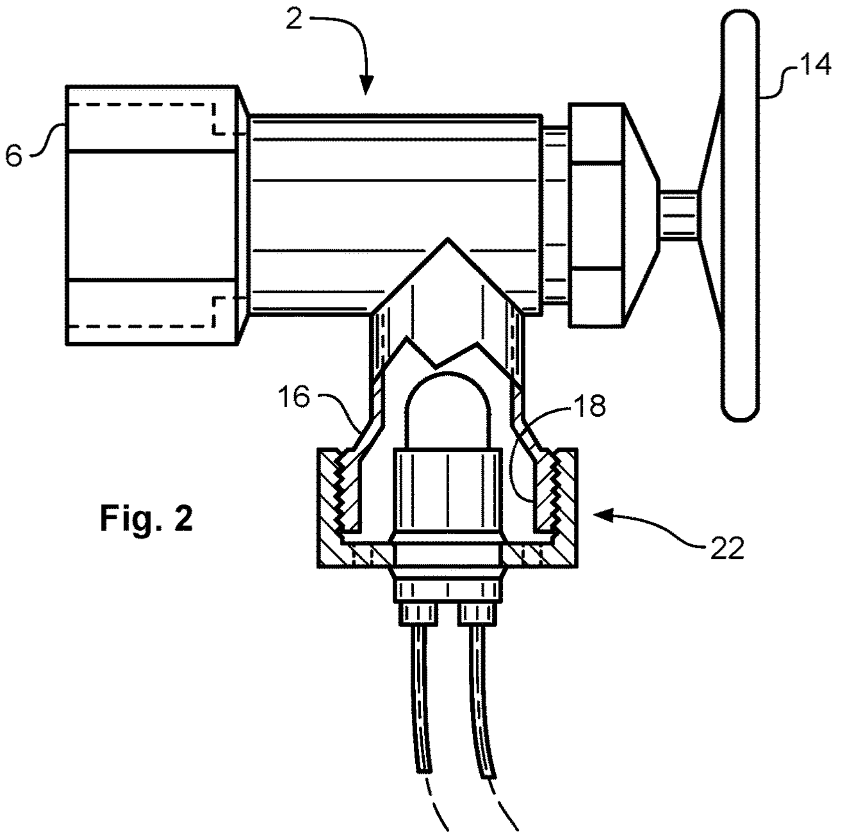
FIG. 2 is a drawing of a hose spigot and lamp assembly according to an illustrative embodiment of the present invention.

Reference is directed to FIG. 2, which is a drawing of a hose spigot 2 and lamp assembly 22, in partial section view, according to an illustrative embodiment of the present invention. The supply pipe connection 6 of the spigot 2 is noted, as well as the operating handle 14, spout 16 and attachment means 18. The lamp assembly 22 engages the attachment means 18 through mating GHT connections, as illustrated. Further details of the lamp assembly 22 will now be discussed. It is noted that a feature of the present disclosure is the ability of the user to replace the lamp without complete disassembly of the apparatus. Rather, the lamp holder and lamp are withdrawn from the mounting collar, as hit remains connected to the spigot, the lamp is them replaced and the lamp holder reinserted into the mounting collar.

Figure 3A:
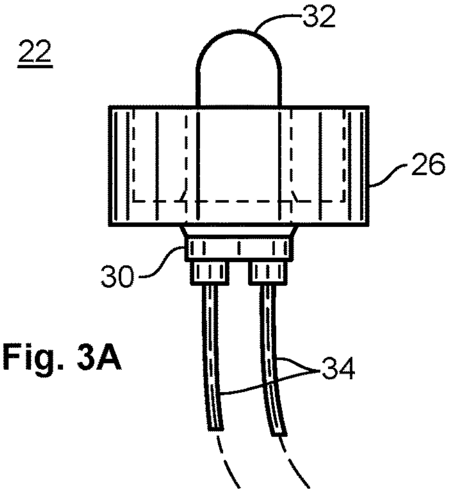
FIGS. 3A and 3B are a side view drawing and an end view drawing, respectively, of a lamp assembly according to an illustrative embodiment of the present invention.
Figure 4:
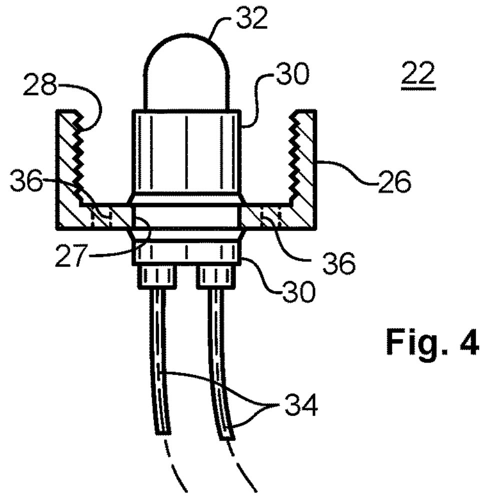
FIG. 4 is a section view drawing of a lamp assembly according to an illustrative embodiment of the present invention.
Figure 3B:
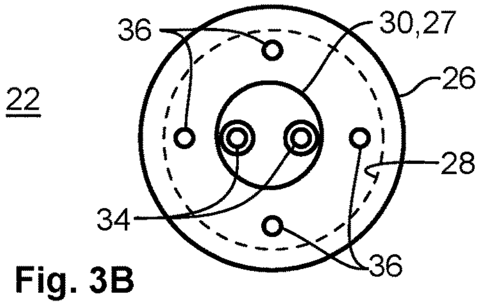

Reference is directed to FIGS. 3A and 3B, which are a side view drawing and an end view drawing, respectively, of a lamp assembly 22 according to an illustrative embodiment of the present invention. The assembly comprises a mounting collar 26 that includes a female GHT 28 disposed on its interior annular surface. A lamp holder opening 27 is provided through to the distal exterior surface of the mounting collar 26 for receiving the lamp holder 30. In addition, plural weep holes 36 are provided through the surface such that any water that may drip from the spigot (not illustrated) is drained away. The incandescent lamp 32 is inserted into the lamp holder 30, as illustrated. FIG. 4 is a section view drawing of a lamp assembly 22 and corresponds with FIGS. 3A, 3B and 3C. In FIG. 4, the mounting collar 26 with female GHT 28 and lamp holder opening 27 are clearly illustrated. The weep hole openings 36 are shown as well. The lamp holder 30 engages the opening 27 and is retained by plural resilient annually ridges formed together with the lamp holder body, as illustrated.

In the illustrate embodiments, the lamp 32 is an automotive type, twelve volt nominal, incandescent lamp. There are a number of different lamp base types available, as will be appreciated by those skilled in the art. The wedge-based lamps are a suitable choice due to the compact nature of the design, relative low cost, and simplicity with which they can be replaced. Generally, a "W5W" type bulb is employed, which designates a wedge based five watt lamp. These "bulbs" actually range in power output, with the #194 lamp making 3.8 watts and the #168 lamp making 4.9 watts. Various manufacturers employ proprietary model designations, including GE 27563, GE 2825, Philips 12961, Wagner Federal Mogul BP17177, Eiko 2825, Hella 78274, Lucas 501, Narva 17177, Sylvania 2825, Stanley WB122, and Tungsram 5307. There are many types of automotive lamps, which employ a range of base types. Wikipedia.org provides an on-line listing of many of them at the following URL:

https://en.wikipedia.org/wiki/List_of_automotive_light_bulb_types

It will be appreciated that virtually any of these lamps might be useable, provided that the power output is in the useful range and that the lamp size is small enough to fit into the spout of a target spigot design.

Figure 5:
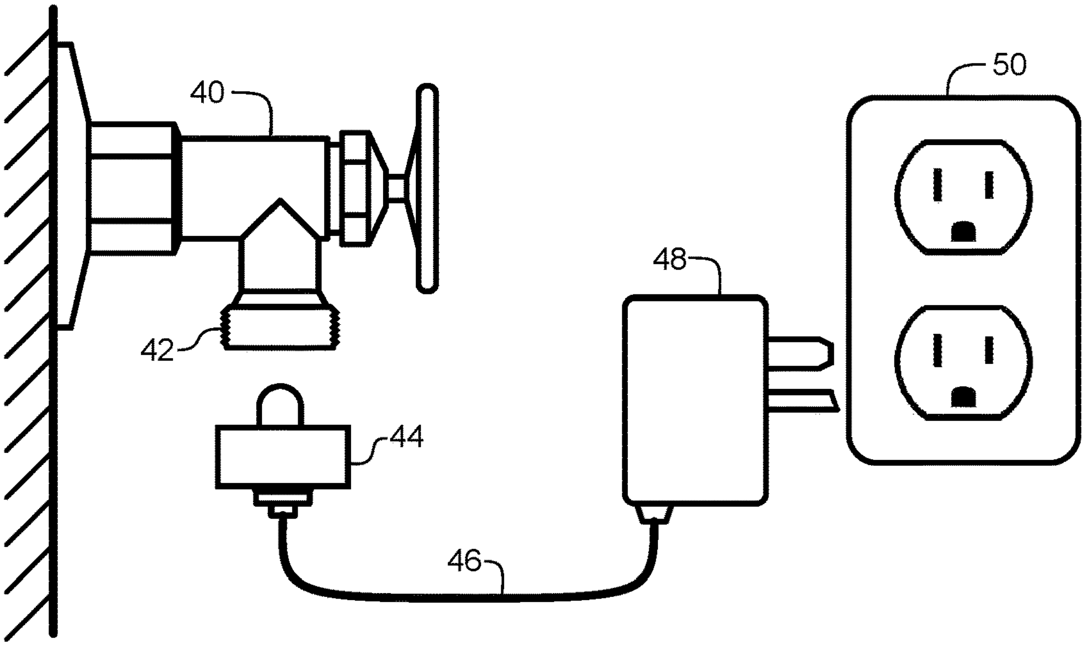
FIG. 5 is a system drawing of a hose spigot, lamp assembly, power adapter, and utility power socket according to an illustrative embodiment of the present invention.

Reference is directed to FIG. 5, which is a system drawing of a hose spigot 40, lamp assembly 44 with attachment means 42, power adapter 48, and utility power socket 50 according to an illustrative embodiment of the present invention. This illustrates a typical application where an exterior utility power outlet 50 is available adjacent an exterior spigot 40. A plug-in type power adapter 48 connects to the utility power outlet 50, and transforms the power into nominal twelve volt direct current power, which is coupled to the lamp assembly 44 through a suitable connecting cable 46. In this embodiment, the power adapter 48 is hard-wired to the lamp assembly 44, however, it may be preferable to include electrical connectors along the cable 46, or on the exterior of the lamp assembly, as will be appreciated by those skilled in the art.

Empirical testing of the arrangement in FIG. 5 indicates that a five watt lamp will protect against freezing in all but sub-zero temperatures. However, in colder temperatures, a higher wattage bulb may be employed. In a first test, where 15° F. ambient temperature was maintained, a 120-minute operational test with a five watt lamp resulted in a valve body temperature of 46° F., which is a 31° F. temperature rise above ambient, and which is well above freezing temperatures. Respecting the possibility of over-temperature in situation where the lamp is powered in warmer weather, a 67° F. ambient temperature resulted in a spigot body temperature of 114° F., which is a 47° F. temperature rise above ambient. This is within a range of safe temperatures. Medically speaking, 70° C. (158° F.) is considered the Safe Limit for no burn, and 71° C. (159.8° F.) is considered a burn temperature. Under ASTM C1055: Temperature of piping must be 60° C. (140° F.) or less to be acceptable preventing burns after holding for 5 minutes.

Figure 6:
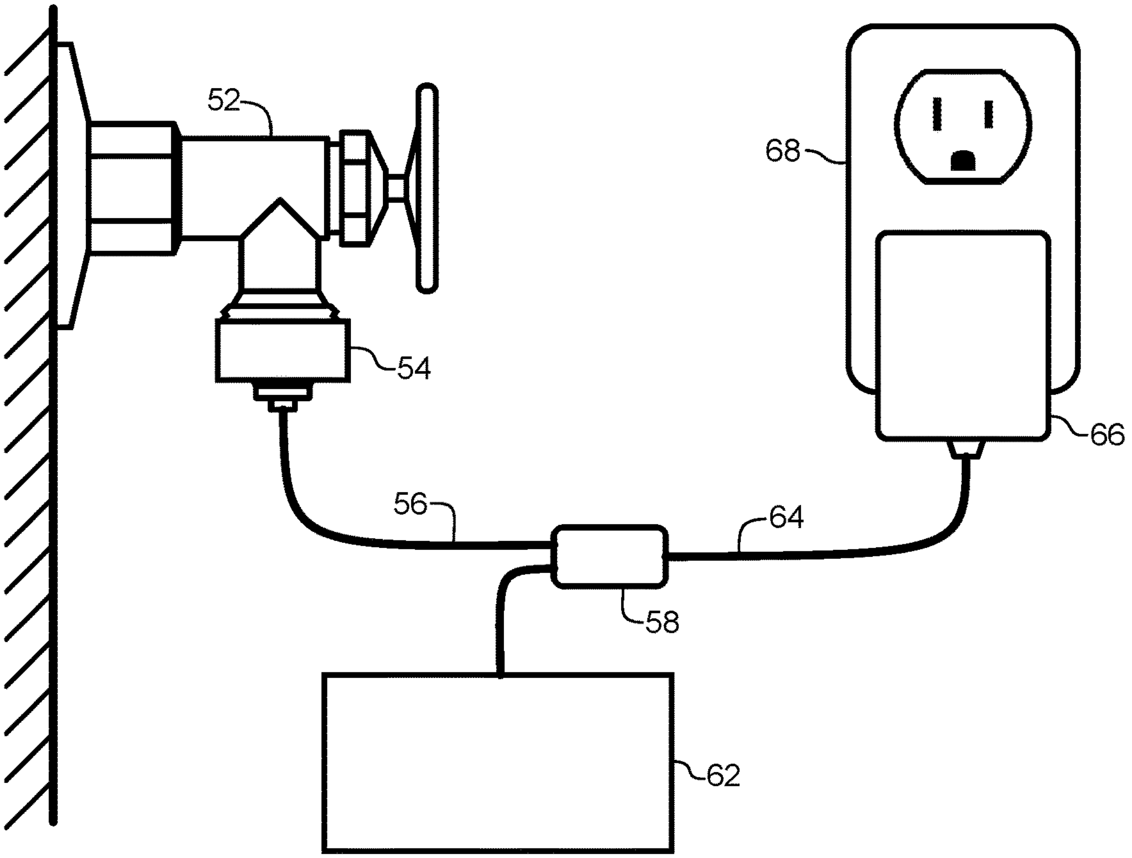
FIG. 6 is a system drawing of a hose spigot, lamp assembly, battery charger, battery, and utility power socket according to an illustrative embodiment of the present invention.

Reference is directed to FIG. 6, which is a system drawing of a hose spigot 52, lamp assembly 54, battery charger 66, battery 62, and utility power socket 68 according to an illustrative embodiment of the present invention. It is noted that the occurrence of utility power outages in freezing temperatures occur from time to time. To alleviate the risk of frozen spigots in this situation, a battery-back system may be preferred. In this case, the aforementioned power adapter is replaced with a battery charger 66 and a rechargeable battery 62, such as a 75 watt-hour lithium ion battery. The battery 62 is joined along the power cables 56, 64, by junction connector 58. As such, either the battery charger 66 itself, or the battery 62, or both in combination, can power the lamp assembly 54. Note that a 5-watt lamp will operate approximately 10-12 hours, or longer, with this arrangement. Of course, higher capacity batteries may be employed if longer run-time is desired.

Reference is directed to FIGS. 7A, 7B, and 7C, which are a side view drawing and two perspective view drawings, respectively, of a lamp holder 70 according to an illustrative embodiment of the present invention. The body 72 of the lamp holder 70 is formed of resilient polymeric material and has plural annular ridges 74 formed together therewith. These ridges retain the lamp holder 70 in the mounting collar (not illustrated). The lamp holder accepts a wedge-based automotive lamp, as discussed above. Pig-tail power leads 76 are provided for connection to a suitable power supply.

Reference is directed to FIGS. 8A, 8B, and 8C, which are a side view drawing and two perspective view drawings, respectively, of a wedge-base incandescent lamp 78 according to an illustrative embodiment of the present invention. These Figures are provided for reference, showing the bulb 80 and wedge-base 82 of the lamp. Power leads (not illustrated) are wrapped about the wedge-base 82 to facilitate electrical connection to the lamp holder (not illustrated).

Reference is directed to FIGS. 9A, 9B, 9C, 9D, and 9E, which are drawings of a mounting collar 84 according to an illustrative embodiment of the present invention. The mounting collar 84 includes an annular body portion 86 with gripping ridges and a cam-lock opening 88 for retaining a twist-lock mounted lamp holder (see FIGS. 10A, 10B, 10C for reference). Plural weep holes 90 are provided to drain away any water leaked from the host spigot (not illustrated).

Reference is directed to FIGS. 10A, 10B, and 10C, which are a side view drawing and two perspective view drawings, respectively, of a lamp holder 92 according to an illustrative embodiment of the present invention. The lamp holder includes body portion 94 molded from a resilient polymeric material with integral twist lock extensions 96, as illustrated. A pair of electrical leads 98 extend from the body portion 94, which are connected to a standard 12-volt barrel connector 100, as are well known in consumer electrical products, featuring a center-positive pin, and an annular ground conductor. This arrangement provides for an extended length power cable if desired. Note that other electric connectors can also be employed. In the automotive arena, the polarized multiple conductor flat connectors are suitable. These are commonly seen in the trailer connector where a 4-conductor flat connector is a standard. A polarized "2-flat" connector pair is desirable because it is water resistant and shields the positive conductor from short circuits, and is available at comparatively low cost.

Figure 11:
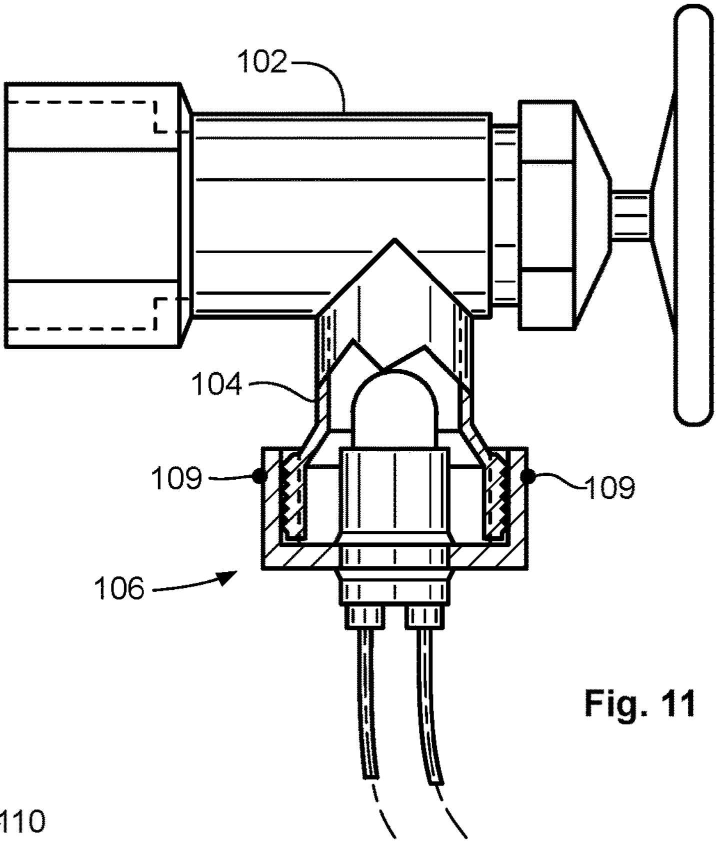
FIG. 11 is a drawing of a spigot and lamp assembly according to an illustrative embodiment of the present invention.
Figure 12B:
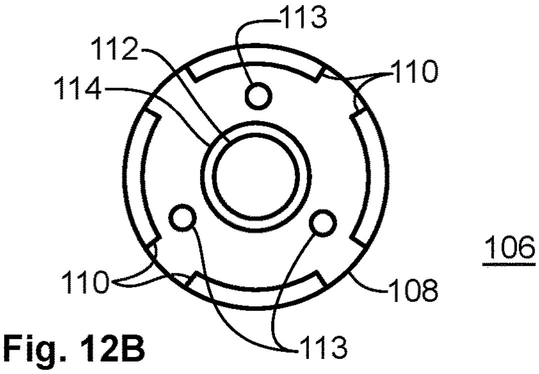
FIGS. 12A, 12B, and 12C are a side view drawing, an end view drawing, and a section view drawing, respectively, of a lamp assembly according to an illustrative embodiment of the present invention.
Figure 12A:
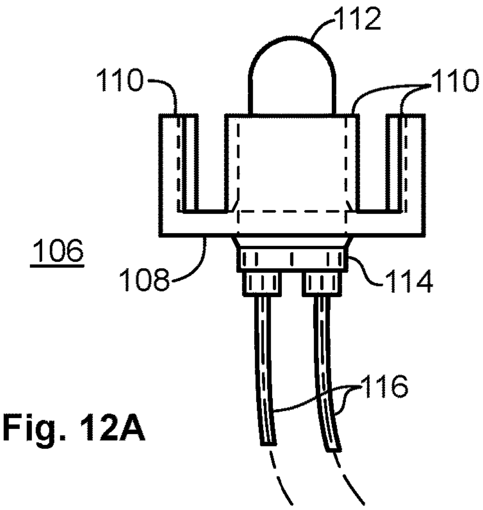
Figure 12C:
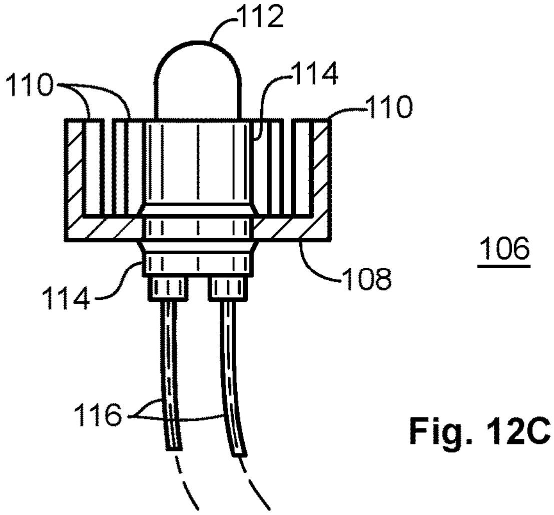

Reference is directed to FIGS. 12A, 12B, and 12C, which are a side view drawing, an end view drawing, and a section view drawing, respectively, of a lamp assembly 106 according to an illustrative embodiment of the present invention. This assembly foregoes the male GHT attachment of the prior illustrative embodiment, rather relying upon a compression connection for retention to the host spigot (reference FIG. 11). The lamp assembly 106 comprises a mounting collar 108 with plural fingers 110 extending therefrom, and with plural weep openings 113 formed therethrough. The fingers 110 engage the spout of the host spigot (not illustrated). A lamp holder 114 is inserted through the mounting collar 108, similar to the prior embodiments. A lamp 112 is inserted into the lamp holder 114, and power leads 116 extend from the exterior of lamp holder 114 as well. Reference is directed to FIG. 11, which is a drawing of a spigot 102 and the lamp assembly 106 of FIGS. 12A, 12B, and 12C, and according to an illustrative embodiment of the present invention. The fingers 110 extend over the spout 104 and are retained in place with compressive forces. These forces may result for the resilient nature of the material, of from an annular elastic or spring band 109, as illustrated. Note that this embodiment is particularly useful on spigots where there is no GHT attachment means.

Figure 13:
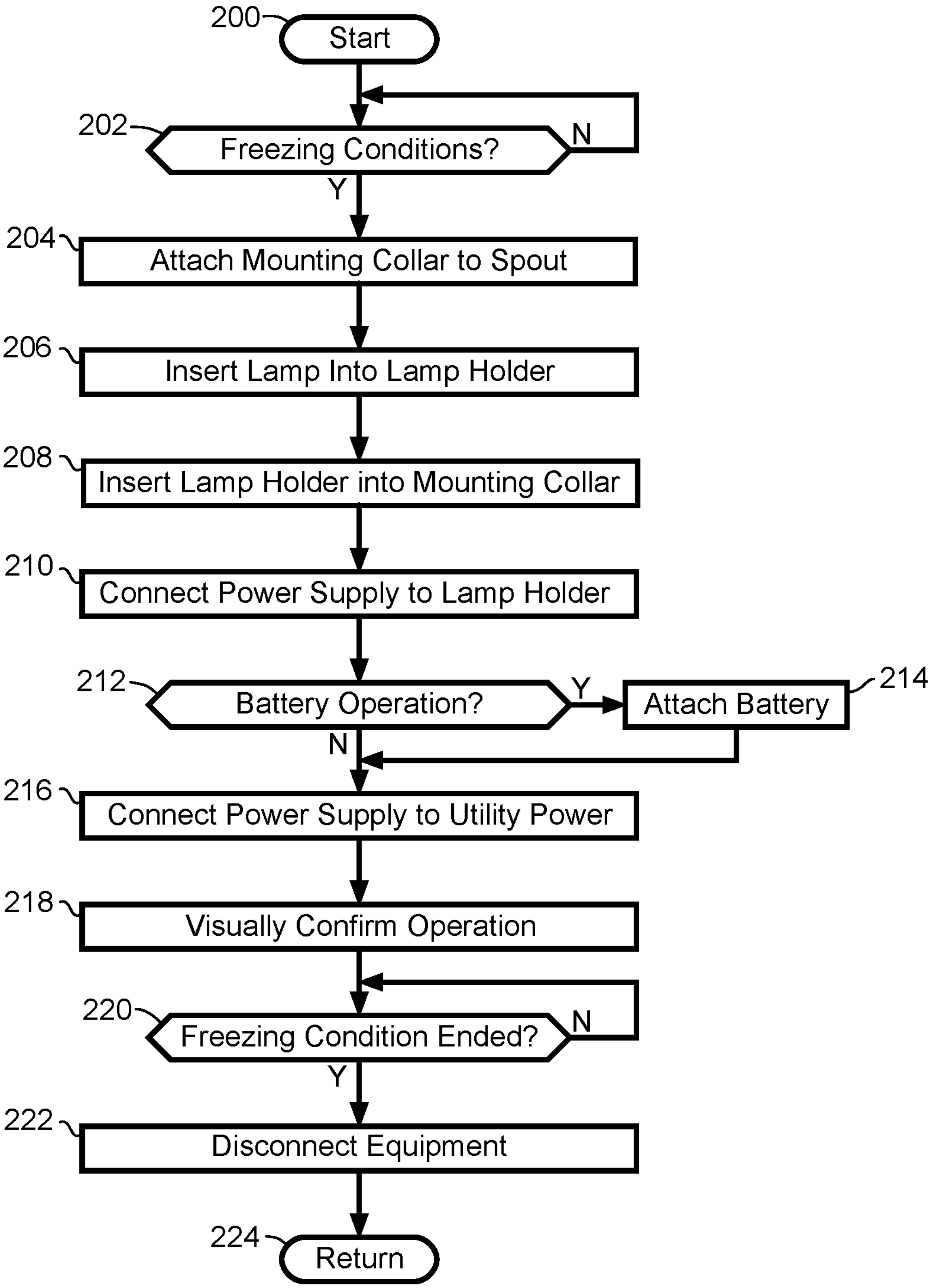
FIG. 13 is a flow diagram of an exemplary method of utilizing a lamp assembly and power supply according to an illustrative embodiment of the present invention.

Reference is directed to FIG. 13, which is a flow diagram of an exemplary method of utilizing a lamp assembly and power supply according to an illustrative embodiment of the present invention. The process begins at step 200 and proceeds to step 202 where the user inquires as to whether freezing conditions exist, or are likely to exist. If they do, flow proceeds to step 208, where the mounting collar is attached to the spout of the exterior spigot to be protected. At step 206 the lamp is inserted into the lamp holder, and then at step 208, the lamp holder and lamp are inserted into the mounting collar. Then, at step 210, the power supply is connected to the lamp holder. At step 212, the user decides whether battery operation is desired, and if so, a battery is attached at step 214. In either case, the process continues to step 216 where the power supply is connected to utility power and operation commences. At step 218, the user visually confirms operation by looking for light emanating form the lamp assembly. Tis is possible due to either the use of a translucent material for the mounting collar, or as light exits the web holes in the mounting collar. At step 220, the user checks to see of the freezing conditions have ended and if so, the equipment is disconnect from the power course(s) and the process returns at step 222.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. An apparatus to prevent water freezing in a spigot that has a discharge spout that presents a male garden hose thread, comprising:

a mounting collar that includes a female garden hose thread configured to engage the the male garden, hose thread of the spigot about the discharge spout;

a lamp holder coupled to said mounting collar, which accepts an incandescent lamp, and locates said incandescent lamp within the discharge spout while said mounting collar is engaged with the spigot, and having an electrical interface coupled to said lamp holder and which extends from an exterior surface of said mounting collar, and a power supply coupled to said electrical interface to selectively illuminate said incandescent lamp, and thereby coupled thermal energy from said incandescent lamp into the spigot.

2. The apparatus of claim 1, and wherein:

said mounting collar has a hole formed therethrough to said exterior surface thereof, which supportively engages said lamp holder when inserted therethough.

3. The apparatus of claim 1, and wherein:

said mounting collar is fabricated from a translucent material enabling light emitted from said incandescent lamp to be visible about said exterior surface of said mounting collar, to thereby facilitate user confirmation that said lamp is illuminated.

4. The apparatus of claim 1, and wherein:

said mounting collar comprises at least a first weep opening passing from the interior of the spout to said exterior surface, to facilitate water drainage from the spigot.

5. The apparatus of claim 1, and wherein:

said mounting collar engages the spout with compressive force provided by an elastic member disposed thereabout.

6. The apparatus of claim 1, and wherein:

said incandescent lamp and power supply operate at a nominal twelve volts direct current, which are intrinsically safe for wet environments.

7. The apparatus of claim 6, and wherein:

said electric interface is a commercially standard twelve volt connector selected from a barrel connector and a two-conductor flat automotive connector.

8. The apparatus of claim 6 and wherein:

said incandescent lamp is a twelve volt nominal lamp commonly available in commercial distribution from automotive parts suppliers.

9. The apparatus of claim 6, and further comprising:

a battery coupled between said power supply and said electrical interface, to thereby provide electric current to said lamp holder while said power supply does not provide electric power.

10. The apparatus of claim 9, and wherein:

said power supply is a battery charger connectable to a utility power supply;

said battery is a rechargeable battery, to thereby facilitate battery operation of said incandescent lamp during power outage of the utility power supply.

11. A method of preventing water from freezing in a spigot that has a discharge spout that presents a male garden hose thread using a mounting collar that includes a female garden hose thread, a lamp holder that accepts an incandescent lamp that is coupled to an electrical interface extending from an exterior surface of the mounting collar, and a power supply, comprising the steps of:

attaching the mounting collar to the spout by engaging the female garden hose thread with the male garden hose thread;

coupling the lamp holder to the mounting collar, thereby locating the incandescent lamp within the discharge spout;

coupling the power supply to the electrical interface, thereby selectively illuminating the incandescent lamp, and thereby coupling thermal energy from the incandescent lamp into the spigot.

12. The method of claim 11, wherein the mounting collar has a hole formed therethrough to the exterior surface thereof, and further comprising the step of:

inserting the lamp holder through the hole, thereby supportively engaging the lamp holder with the mounting collar.

13. The method of claim 11, wherein the mounting collar is fabricated from a translucent material, and further comprising the step of:

enabling light emitted from the incandescent lamp to be visible about the exterior surface of the mounting collar, and thereby facilitating user confirmation that the lamp is illuminated.

14. The method of claim 11, and further comprising the step of:

engaging the mounting collar with the spout with using compressive force provided by an elastic member disposed thereabout.

15. The method of claim 11, wherein the incandescent lamp and power supply operate at a nominal twelve volts direct current, thereby providing for intrinsically safe operation in wet environments.

16. The method of claim 15, and further comprising the steps of:

coupling a battery between the power supply and the electrical interface, and thereby providing electric current to the lamp holder while the power supply is not providing electric power.

17. The method of claim 16, wherein the power supply is a battery chargers and the battery is a rechargeable battery, and further comparing the steps of:

connecting the power supply to a utility power supply, and thereby facilitating battery operation of the incandescent lamp during power outage in the utility power supply.

18. The method of claim 11, and wherein the mounting collar includes at least a first weep opening extending from the interior thereof through to the exterior surface, and further comprising the step of:

visually determine that light is emitted through the at least a first weep opening, thereby confirming operation of the lamp.

* * * * *